(12) United States Patent
Ramesan et al.

(10) Patent No.: US 11,321,333 B2
(45) Date of Patent: May 3, 2022

(54) AUTO-ENRICHMENT OF CONTENT

(71) Applicant: Microsoft Technology Licensing, LLC., Redmond, WA (US)

(72) Inventors: Roshin Lal Ramesan, Redmond, WA (US); Michael Francis Palermiti, II, Sammamish, WA (US); Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 15/249,013

(22) Filed: Aug. 26, 2016

(65) Prior Publication Data
US 2017/0308590 A1 Oct. 26, 2017

Related U.S. Application Data

(60) Provisional application No. 62/327,631, filed on Apr. 26, 2016.

(51) Int. Cl.
| | |
|---|---|
| G06F 16/248 | (2019.01) |
| G06Q 30/02 | (2012.01) |
| H04L 51/046 | (2022.01) |
| G06F 16/245 | (2019.01) |
| G06F 16/2457 | (2019.01) |
| G06Q 10/10 | (2012.01) |
| G06F 3/14 | (2006.01) |

(52) U.S. Cl.
CPC .............. *G06F 16/248* (2019.01); *G06F 3/14* (2013.01); *G06F 16/245* (2019.01); *G06F 16/24575* (2019.01); *G06Q 10/107* (2013.01); *G06Q 10/109* (2013.01); *G06Q 30/02* (2013.01); *H04L 51/046* (2013.01)

(58) Field of Classification Search
None
See application file for complete search history.

(56) References Cited

U.S. PATENT DOCUMENTS

| | | |
|---|---|---|
| 6,778,979 B2 | 8/2004 | Grefenstette et al. |
| 6,873,985 B2 | 3/2005 | Newman |

(Continued)

FOREIGN PATENT DOCUMENTS

| | | |
|---|---|---|
| CN | 102385615 A | 3/2012 |
| WO | 2015116105 A2 | 8/2015 |
| WO | 2015120370 A1 | 8/2015 |

OTHER PUBLICATIONS

Bhaowal, Mayukh, "Bringing Links to Life with Link Preview", Published on: Mar. 12, 2014 Available at: http://yahoomail.tumblr.com/post/79395405926/bringing-links-to-life-with-link-preview.

(Continued)

*Primary Examiner* — Amresh Singh

(57) ABSTRACT

User interaction efficiency is improved by providing automatic enrichment of content with contextually relevant information. While a user is utilizing a productivity application, the system may receive a content item, such as an email or calendar event, to display within an application user interface. The system analyzes and identifies contextually relevant information based on the content item. Thereafter, the system displays the application user interface including the content item which is modified to display the contextually relevant information within the content item.

20 Claims, 15 Drawing Sheets

(56) References Cited

U.S. PATENT DOCUMENTS

| | | |
|---|---|---|
| 7,496,500 B2 | 2/2009 | Reed et al. |
| 7,925,306 B2 | 4/2011 | Carmody et al. |
| 8,073,910 B2 | 12/2011 | Tokuda et al. |
| 8,239,874 B2 | 8/2012 | Anderson et al. |
| 8,429,099 B1 | 4/2013 | Perkowitz et al. |
| 8,490,185 B2 | 7/2013 | Gillum et al. |
| 8,543,656 B2 | 9/2013 | Khoo |
| 8,972,429 B2 | 3/2015 | Goldstein et al. |
| 9,043,403 B2 | 5/2015 | Schnitman et al. |
| 9,077,672 B2 | 7/2015 | Khoo |
| 9,135,363 B2 | 9/2015 | Chow |
| 9,218,819 B1 | 12/2015 | Stekkelpak et al. |
| 9,356,889 B2 | 5/2016 | Caskey et al. |
| 2007/0250576 A1 | 10/2007 | Kumar et al. |
| 2008/0126143 A1 | 5/2008 | Altman et al. |
| 2008/0307046 A1* | 12/2008 | Baek .................. G06F 16/958 709/203 |
| 2009/0210262 A1 | 8/2009 | Rines et al. |
| 2009/0222296 A1 | 9/2009 | Wagner et al. |
| 2009/0248806 A1 | 10/2009 | Teman |
| 2010/0030740 A1* | 2/2010 | Higgins ................ G09B 29/10 715/762 |
| 2010/0100370 A1 | 4/2010 | Khouri et al. |
| 2010/0169153 A1 | 7/2010 | Hwacinski et al. |
| 2010/0235636 A1 | 9/2010 | Cohen |
| 2011/0179060 A1 | 7/2011 | Chilakamarri et al. |
| 2011/0288962 A1* | 11/2011 | Rankin, Jr. ............ G06Q 30/02 705/27.1 |
| 2012/0005284 A1 | 1/2012 | Tse |
| 2012/0042024 A1 | 2/2012 | Kirshenboim |
| 2012/0084340 A1 | 4/2012 | McCormack et al. |
| 2012/0117484 A1* | 5/2012 | Convertino .......... G06Q 10/101 715/744 |
| 2012/0136939 A1 | 5/2012 | Stern et al. |
| 2012/0197728 A1 | 8/2012 | Luna et al. |
| 2012/0254321 A1 | 10/2012 | Lindsay et al. |
| 2013/0031078 A1 | 1/2013 | El daher et al. |
| 2013/0091218 A1 | 4/2013 | Solomon et al. |
| 2013/0268839 A1 | 10/2013 | Lefebvre et al. |
| 2013/0290079 A1 | 10/2013 | Chavan |
| 2014/0059567 A1 | 2/2014 | Wilson et al. |
| 2014/0082521 A1 | 3/2014 | Carolan et al. |
| 2014/0172986 A1 | 6/2014 | Kumar et al. |
| 2014/0337441 A1* | 11/2014 | Schnitman .............. H04L 51/18 709/206 |
| 2014/0372867 A1 | 12/2014 | Tidhar et al. |
| 2015/0074558 A1 | 3/2015 | Haskins et al. |
| 2015/0082189 A1 | 3/2015 | Baer et al. |
| 2015/0100437 A1 | 4/2015 | Guo et al. |
| 2015/0135088 A1 | 5/2015 | Lim et al. |
| 2015/0200899 A1 | 7/2015 | Sanketi |
| 2015/0271118 A1 | 9/2015 | Nudel et al. |
| 2016/0065511 A1 | 3/2016 | Ganin et al. |
| 2016/0078455 A1 | 3/2016 | O'donnell et al. |
| 2016/0086116 A1 | 3/2016 | Rao et al. |
| 2016/0219004 A1 | 7/2016 | Erez et al. |
| 2018/0121025 A1 | 5/2018 | Ramesan et al. |
| 2018/0121055 A1 | 5/2018 | Quintero et al. |

OTHER PUBLICATIONS

"International Search Report and Written Opinion Issued in PCT Application No. PCT/US2017/027085", dated May 26, 2017, 13 Pages.

"Automatically Create Calendar Events When Receiving Email", Retrieved From: https://web.archive.org/web/20140531081311/http://www.macosxtips.co.uk/index_files/automatically-create-calendar-events-when-receiving-mail.php, Apr. 6, 2014, 5 Pages.

"Flight Reservation", Retrieved From: https://developers.google.com/gmail/markup/reference/flight-reservation, Retrieved Date: Aug. 29, 2016, 17 Pages.

"Google Gmail One Button Action—myERP", Retrieved From: https://www.youtube.com/watch?v=W9FInINAJ3A, Retrieved Date: Sep. 6, 2016, 1 Page.

"Non Final Office Action Issued In U.S. Appl. No. 15/336,699", dated Sep. 19, 2018, 27 Pages.

"Non Final Office Action Issued in U.S. Appl. No. 15/336,717", dated Sep. 27, 2018, 19 Pages.

"International Search Report and Written Opinion Issued in PCT Application No. PCT/US2017/057071", dated Jan. 3, 2018, 12 Pages.

Protalinski, Emil, "Gmail Will Now Automatically Add Google Calendar Events For Emails With Flight, Hotel, Restaurant, Or Ticket Info", Retrieved From: https://venturebeat.com/2015/08/25/gmail-will-now-automatically-add-google-calendar-events-for-emails-with-flight-hotel-restaurant-or-ticket-info/, Aug. 25, 2015, 4 Pages.

"Final Office Action Issued in U.S. Appl. No. 15/336,699", dated Mar. 21, 2019, 25 Pages.

"Final Office Action Issued in U.S. Appl. No. 15/336,717", dated Mar. 21, 2019, 17 Pages.

"Office Action Issued in European Patent Application No. 17718772.1", dated Jul. 31, 2019, 8 Pages.

"Non-Final Office Action Issued in U.S. Appl. No. 15/336,699", dated Oct. 2, 2019, 34 Pages.

"Non Final Office Action Issued in U.S. Appl. No. 15/336,717", dated Nov. 29, 2019, 20 Pages.

"Advisory Action Issued in U.S. Appl. No. 15/336,699", dated Jul. 5, 2019, 5 Pages.

"Office Action Issued in European Patent Application No. 17800975.9", dated Aug. 26, 2020, 7 Pages.

"Summons to Attend Oral Proceeding Issued in European Patent Application No. 17718772.1", Mailed Date: May 20, 2020, 12 Pages.

"Summons to Attend Oral Proceedings Issued in European Patent Application No. 17800975.9", Mailed Date: Mar. 30, 2021, 10 Pages.

"First Office Action and Search Report Issued in Chinese Patent Application No. 201780026131.9", dated Jul. 19, 2021, 19 Pages.

"Office Action Issued in Indian Patent Application No. 201847036303", dated Aug. 3, 2021, 7 Pages.

"Final Office Action Issued In U.S. Appl. No. 15/336,699", dated Feb. 21, 2020, 37 Pages.

"Final Office Action Issued In U.S. Appl. No. 15/336,717", dated Mar. 18, 2020, 22 Pages.

* cited by examiner

MOBILE COMPUTING DEVICE

AUTO-ENRICHMENT OF CONTENT

CROSS-REFERENCE TO RELATED APPLICATIONS

The present application claims benefit from U.S. Provisional Application No. 62/327,631, filed Apr. 26, 2016 and having the title "AUTO-ENRICHMENT OF CONTENT," which is herein incorporated by reference in its entirety.

BACKGROUND

Computer users will typically utilize one or more productivity applications throughout the day, including communication and calendar applications. Through the use of these productivity applications, the computer user may receive numerous types of content items such as emails, calendar appointments, and other promotional material. Unfortunately, these content items only present a limited amount of information for the user.

In order to see more information about the content item, the computer user will stop using the productivity application and use other software applications. For example, the computer user may utilize a web browser to review a website associated with the content item. Alternatively, the computer user may perform a web search for additional information relating to the content item. In either situation, the computer user may spend countless hours browsing unrelated information on the website or filtering though irrelevant search results, thus detracting from the user's overall productivity and requiring a mental context switch.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Aspects are directed to a device, method, and computer-readable medium for improving user interaction efficiency by providing enriched content. In particular, aspects are directed to the automatic enrichment of content with contextually relevant information. For example, while a user is utilizing a productivity application, such as an email application or a calendar application, the system receives a content item, such as an email or a calendar event, for display within an application user interface. The system analyzes and identifies contextually relevant information based on the content item and the content item type. For example, a calendar item may be travel related, while an email item may relate to a coupon. Thereafter, the system displays the application user interface including the content item, which is modified to display the contextually relevant information within the content item. Thus, user interaction efficiency is improved by automatically providing enriched content.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 5A-5G illustrate an example of a communications application displaying enriched content including a content item and contextually relevant information;

DETAILED DESCRIPTION

Figure 1:
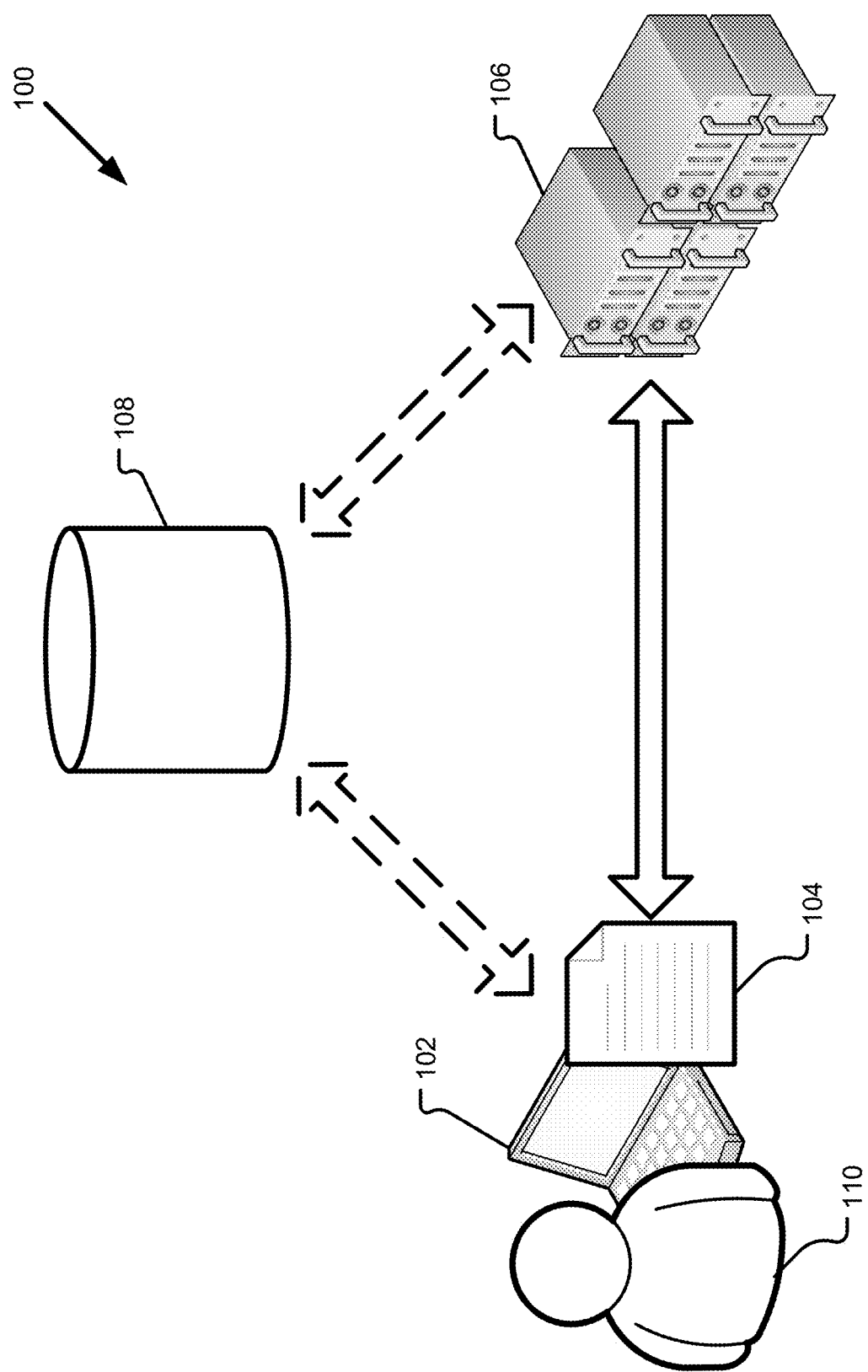
FIG. 1 is a block diagram of a representation of an environment for providing improved user interaction efficiency by automatic enrichment of content with contextually relevant information.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer readable medium for improved user interaction efficiency by the automatic enrichment of content with contextually relevant information. For example, while a user is utilizing a productivity application, such as an email application or a calendar application, the system receives a content item, such as an email or a calendar event, for display within an application user interface. The system analyzes the content item to determine an entity associated with the content item and the context of receiving the content item, which may include identifying a destination city, restaurant, or shopping store. Thereafter, the system queries one or more data sources for responsive results. The results are parsed in view of context associated with the entity and/or user in order to identify contextually relevant information. In response to identifying contextually relevant information, the system displays the application user interface including the content item, which is modified to display the contextually relevant information within the content item. Thus, user interaction efficiency is improved by automatically providing enriched content.

FIG. 1 is a block diagram of a representation of a computing environment for improving user interaction efficiency by automatically enriching content with contextually relevant information (a content enrichment system 100). The computing environment may be implemented by a single computing device or a distributed computing network. As illustrated, the example environment includes a computing device 102 executing an application 104, and in communication with a server 106. Further, the computing device 102 and/or server 106 are in communication with data sources 108 to retrieve contextually relevant information. It should be noted that the data sources 108 may include locally accessible data sources 108 or external data sources 108 to the computing device 102.

The computing device 102 illustrated in FIG. 1 is illustrated as a laptop computer. However, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 6, 7A, and 7B.

As discussed above, a user 110 may utilize an application 104 on the computing device 102 for a variety of tasks, which may include, for example, writing, taking and organizing notes, preparing presentations, sending and receiving electronic mail, scheduling calendar events, browsing web content, and the like. Applications 104 may include thick client applications, which may be stored locally on the computing device 102, or may include thin client applications (i.e., web applications) that reside on a remote server and accessible over a network, such as the Internet or an intranet. A thin client application may be hosted in a browser-controlled environment or coded in a browser-supported language and rely on a common web browser to render the application executable on the computing device 102. According to an aspect, the application 104 is a program that is launched and manipulated by an operating system, and manages content within an electronic content item and presented on a display screen. According to examples, a user interface is provided for enabling the user 110 to interact with functionalities of the application 104 and with electronic content items through manipulation of graphical icons, visual indicators, and the like.

As illustrated, the example computing device 102 is in communication with a server 106. Specifically, the application 104 executed on the computing device 102 is configured to communicate with the server 106 to send and receive email communications and schedule calendar events. Content in an electronic content item may vary according the application 104. The content may comprise one or more objects present or embedded in the electronic content item including, but not limited to: text (including text containers), numeric data, macros, images, movies, sound files, and metadata.

With reference still to FIG. 1, the application 104 includes or is in communication with an enriched content system, operative to provide automatic enrichment of content with contextually relevant information for improved user interaction efficiency. According to aspects, the enriched content system is operative to generate a user interface to display an electronic content item and contextually relevant information. According to aspects, the user interface may be modified to display the electronic content item to include the contextually relevant information in-line with the electronic content item. According to other aspects, the user interface may be modified to display the contextually relevant information embedded within the electronic content item.

The application 104 is further illustrative of a software module, system, or device operative to generate a user interface to display an electronic content item. According to an example, when an electronic content item is opened in an application 104, the enriched content system displays at least a portion of the content in the document in a display space, such as an application window. The enriched content system updates the user interface to display the selected electronic content item in the display space. The enriched content system is further operative to update the user interface to display (at least a portion of) the contextually relevant information.

Figure 2:
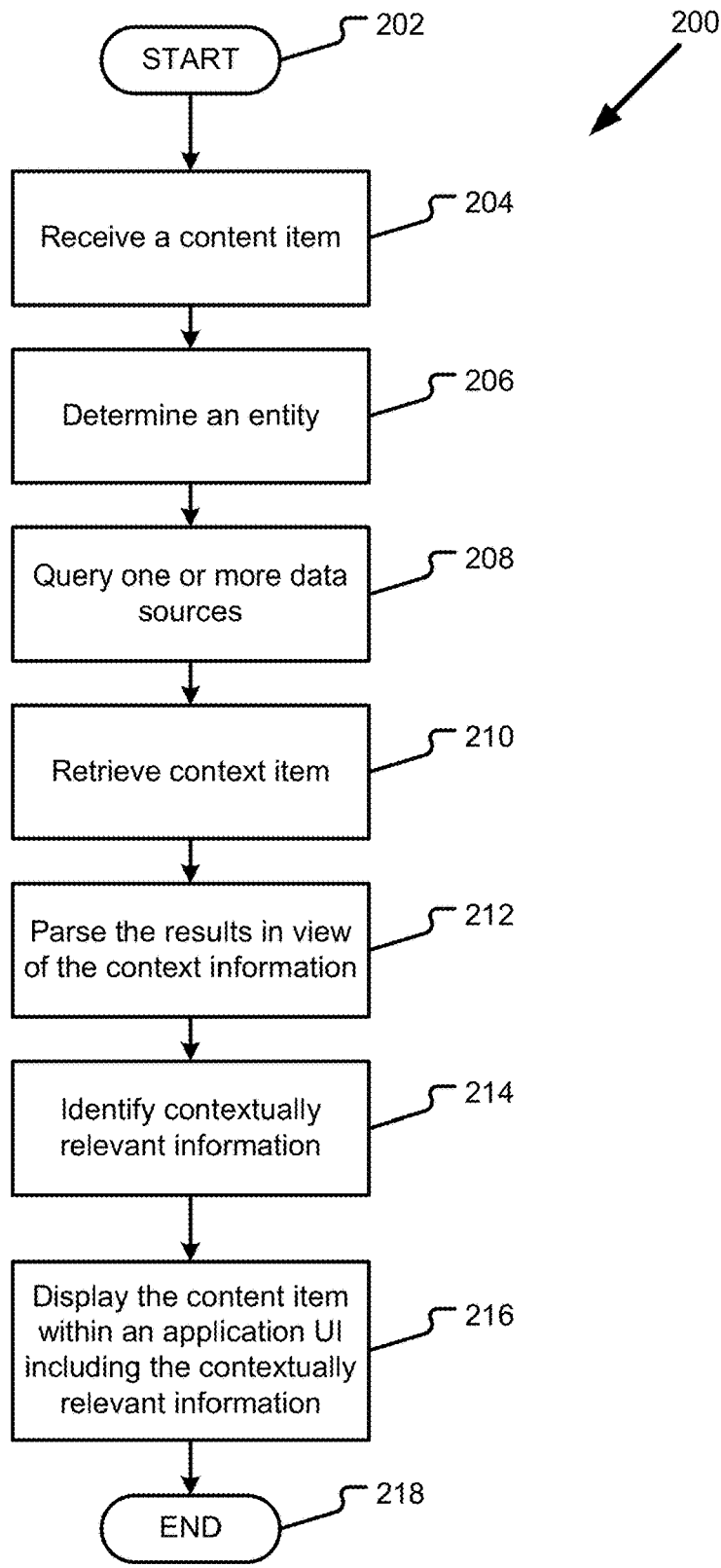
FIG. 2 is a flow chart showing general stages involved in an example method for automatic enrichment of content with contextually relevant information.

FIG. 2 is a flow chart showing general stages involved in an example method 200 for automatic enrichment of content with contextually relevant information.

With reference to FIG. 2, the method 200 begins at start OPERATION 202, and proceeds to OPERATION 204, where the computing system receives a trigger point. In the illustrated example, the trigger point occurs when the computer system identifies a content item to display within an application user interface. In one example, the computing system receives user input that causes an email message to be displayed. In another example, the computing system receives user input that causes a calendar event to be displayed or to be scheduled. In other examples, the trigger point may include other types of content items associated with the productivity application 104.

The method 200 continues to OPERATION 206, where the computing system determines an entity associated with the content item. Specifically, the computing system is operable to receive the entity information directly from the content item, extract the entity information using template-based models, or extract the entity information using machine learning models. In accordance with one aspect, the content item is organized in accordance with a predefined structure associated with the entity. In one example, the content item is organized in accordance with a promotion or coupon structure. In another example, the content item is organized in accordance with a flight reservation. In another example, the information is extracted based on template-based models, which may identify a confirmation number, seat assignment, etc., at a specified location within the content item, which are identified as entities configurable to be enriched.

According to one aspect, it should be recognized that the computing system utilizes labels or tags (such as hashtags) to identify the entity. The labels or tags allow the computing device to provide an organized and streamlined view of the message list based on selection of the labels or tags. In other words, content within the message list may be tailored to a specific content type and/or context based on the tagging or classifications of a group of emails.

The method 200 continues to OPERATION 208, where the computing system queries data sources 108 for results. Specifically, the computing system queries one or more data sources 108 for results that relate to the entity. The queries may be performed by one or more computing devices within the computing system. For example, the queries may be performed client-side, server-side or a combination of client-side and server-side. Further, the computing system may perform the queries of local data sources 108 or external data sources 108. In accordance with aspects, the queries may be performed utilizing a search engine, a knowledge graph, or a database. Additionally, the queries may be based on inferences relating to the queries. For example, if the entity is a city, restaurant, etc., then the computing system may infer other related information such as a specific location, an airline carrier, etc. Additionally, the computing system may infer relationships between other communications or events within the user's communications and calendar applications (e.g., email items, calendar items, task items, etc.) that are utilized to enrich the context. The other related information may be utilized to provide additional results that relate to the entity.

The method 200 continues to OPERATION 210, where the computing system retrieves context relating to the content item. For example, the computing system may retrieve information relating to the user's communications, calendar events, location, time zone, etc., in order to provide relevant contextual information that is applicable to a particular scenario.

The method 200 continues to OPERATIONS 212 and 214, where the computing system parses the results in view of the context and identifies contextually relevant information respectively. Based on the relevant contextual information, the computing system analyzes the relevance of the entities. In one example, the computing system utilizes a knowledge graph to determine the strength of an entity relative to other entities in order to provide the most relevant contextual information. For example, the computing system is operable to determine that an entity located 2.3 miles away is of greater strength than an entity that is 5.6 miles away from the user.

According to another example, consider that the computing system has identified the entity as travel to a destination city. In order to provide the most relevant contextual information, the computing system prioritizes the information based on the context, such as the time and location of the departure city or the destination city. For example, the user may be particularly interested in contextual information related to travel to the destination city or events in the destination city. However, the user may not be interested in viewing contextual information related to facts about the destination city, home ownership, or apartment rental in the destination city. Accordingly, the computing system filters the contextual information based on information that is relevant to the user and/or content item.

The method 200 continues to OPERATION 216, where the computing system displays the contextually relevant information within the application user interface. According to aspects, the user interface is modified to display the content item and contextually relevant information. In one example, the user interface may be modified to display the electronic content item to include the contextually relevant information in-line with the electronic content item. In another example, the user interface is modified to display the contextually relevant information embedded within the electronic content item. Thus, the computing system automatically provides the relevant contextual information that allows the user to complete actions directly from the productivity application. For example, the application may provide relevant contextual information that allows the user to call the entity, check store hours, check-in, etc. The method 200 may then conclude at end OPERATION 218.

Figure 3:
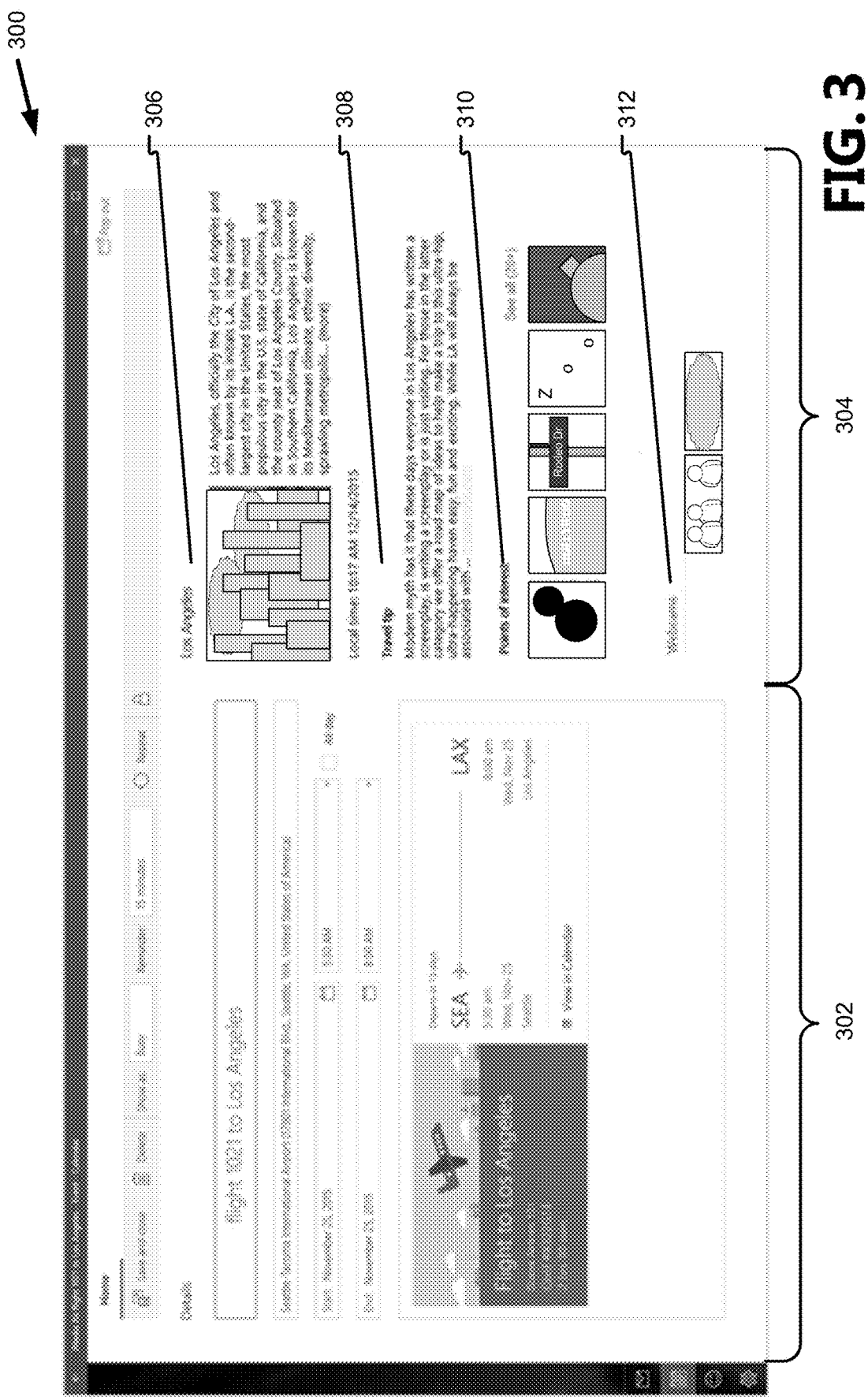
FIG. 3 illustrates an example of a calendar application displaying enriched content including a content item and contextually relevant information.

FIG. 3 illustrates an example of a calendar application 300 displaying enriched content including a content item and contextually relevant information. In the illustrated example, the calendar application 300 is configured to display a traditional calendar event 302 on the left side of the user interface. The illustrated calendar event includes information detailing information relating to a flight to Los Angeles, which is an identified entity in the category of travel, including the departing city, travel times, and confirmation number. Further, the user interface includes enriched content 304 within the right portion of the user interface.

According to aspects, the enriched content 304 may either attach that information statically as metadata to that content item or the enriched content 304 may retrieve the enriched content 304 on demand. According to one aspect, the enriched content 304 is dynamically refreshed every time the content item is displayed to ensure the freshness of details that pertain to a location or a time. In the illustrated example, the enriched content 304 includes various information relating to the destination city 306, travel tips 308, particular points of interest 310, and webcams 312 displaying areas of the destination city.

Figure 4:
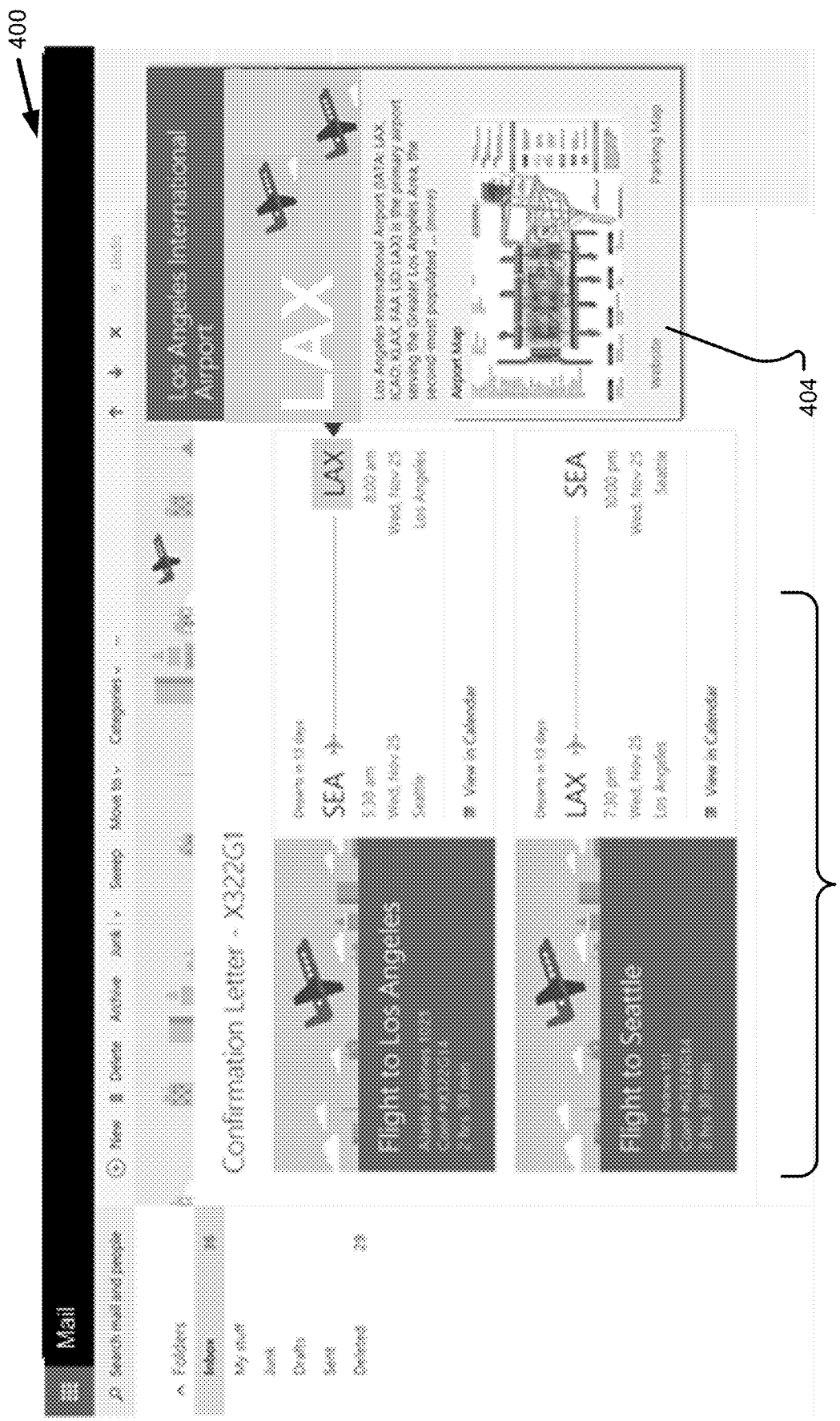
FIG. 4 illustrates an example of a communications application displaying enriched content including a content item and contextually relevant information.

FIG. 4 illustrates an example of a communications application 400 displaying enriched content, including a content item 402 and contextually relevant information 404. For example, after a user has booked a flight, the airline carrier will typically send a confirmation email including the travel itinerary. Accordingly, there are multiple options to provide the user with enriched content.

In accordance with one example aspect, the carrier may identify contextually relevant content to enrich the confirmation email. Once the carrier has identified the enriched content, the airline carrier may send the contextually relevant content with the email including the itinerary.

According to another example aspect, once the email including the itinerary has been received, a computing device associated with the email application performs an analysis of the itinerary to determine relevant information for identifying contextually relevant content. For example, the computing device may identify an airline carrier, a departing location, and an arrival destination. This information may be provided directly by the airline carrier, or the computing device may automatically extract the information and identify contextually relevant content. The computing device may also automatically add a calendar event including the itinerary information and the enriched content. Further, the calendar event may include check-in information and/or links for the user's convenience.

According to another example aspect, the computing device provides updated status information regarding the itinerary. The status information may be updated manually, at a selected interval or continuously throughout a day. The contextually relevant content may also include check-in information, flight status information, gate information, and any other additional content that assists users with managing their itineraries.

Further, the extracted information may then be summarized for more efficient review of the itinerary information. Additionally, the contextually relevant content may be included within the email to allow the user to more efficiently review details relating to promotions, restaurants, or other contextually relevant content.

FIGS. 5A-5G illustrate an example of a communications application 500 displaying enriched content including a content item and contextually relevant information. In accordance with another aspect, the user may receive an email including various types of promotional material. According to aspects, the communications application 500 analyzes properties of the content item and queries one or more data sources for contextually relevant information. Unlike the travel example, which shows points of interest, the communications application 500 is modified to provide contextually relevant content associated with the promotional material associated with the content item.

With regard to FIGS. 5A-5G, the communications application 500 includes one or more mail folders 502 containing email messages associated with the user. In the illustrated example, the "Shopping" email 504 has been selected. In response to receiving a selection to display the email, the communications application 500 analyzes properties of the content item and queries one or more data sources for contextually relevant information. For example, in the illustrated example, the store sending the promotional email is identified as an entity. Further, the entity or store is further analyzed to identify a local version of the entity for the user (e.g., the instance of the entity that is geographically closest to the user), such that the contextually relevant information includes applicable information, e.g., location in relation to the user, store hours, etc.

Further, the communications application 500 modifies the display of the content item to include the contextually relevant information within the content item. As previously discussed, the contextually relevant information may be embedded within the content item, where the contextually relevant information is dynamically generated upon receiving a selection to display the content item, or where the contextually relevant information is presented in-line with the content item. The illustrated communications application 500 includes an example content item and further includes options for accessing the contextually relevant information directed from the content item. For example, the illustrated communications application 500 includes a plurality of links to direct a user to different contextually relevant information associated with the content item. Thus, the user is allowed to continue to use the productivity application (e.g., the communications application 500) to perform an action relating to the contextually relevant content.

Figure 5A:

With regard to FIG. 5A, the first option 508 presented within the contextually relevant content bar 506 provides a link for contacting the entity. For example, the first option may direct the user to a customer service phone line. In another example, selection of the first option within the contextually relevant content bar 506 causes the computer device to perform a telephone call to the entity.

Figure 5B:
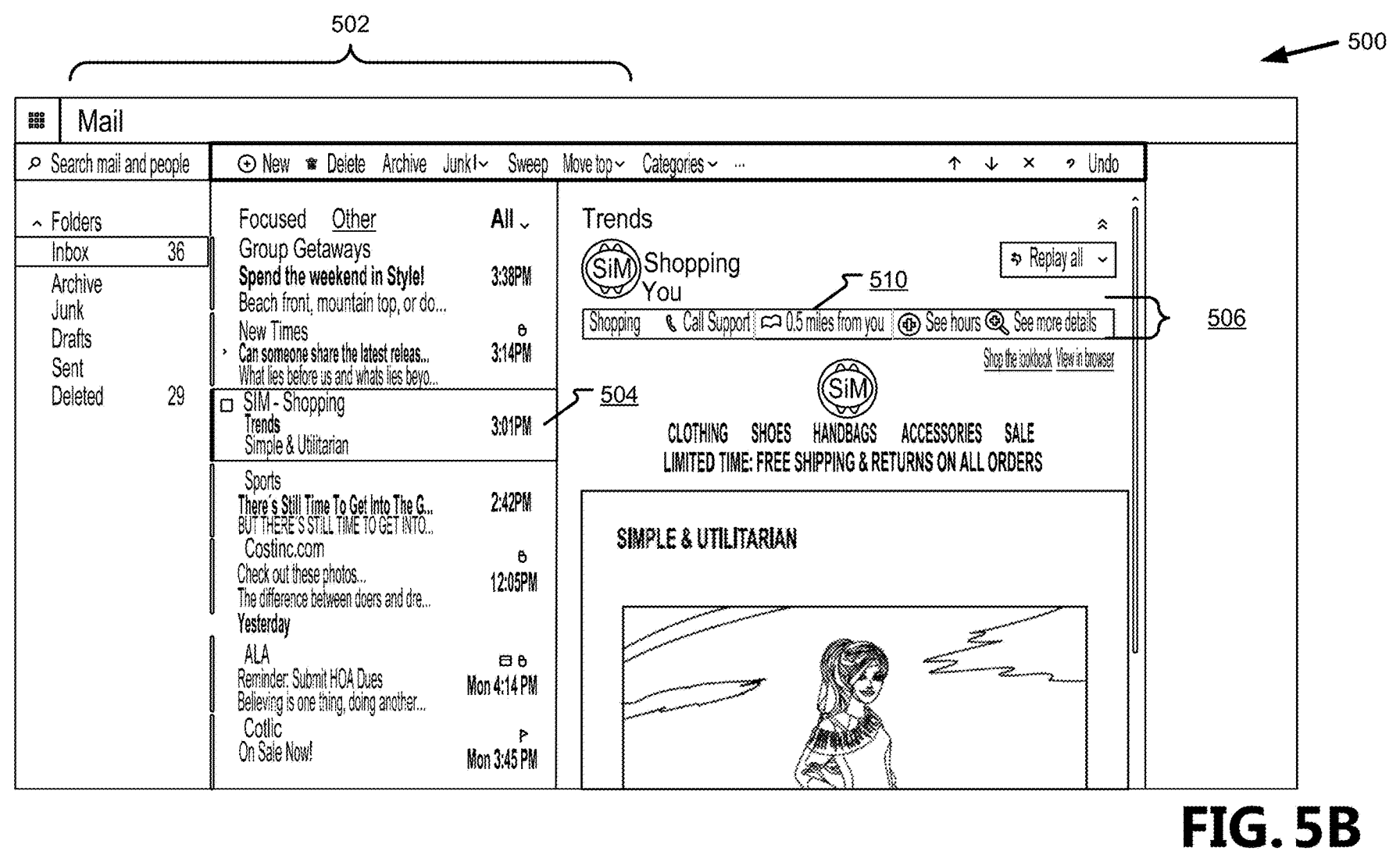
Figure 5C:
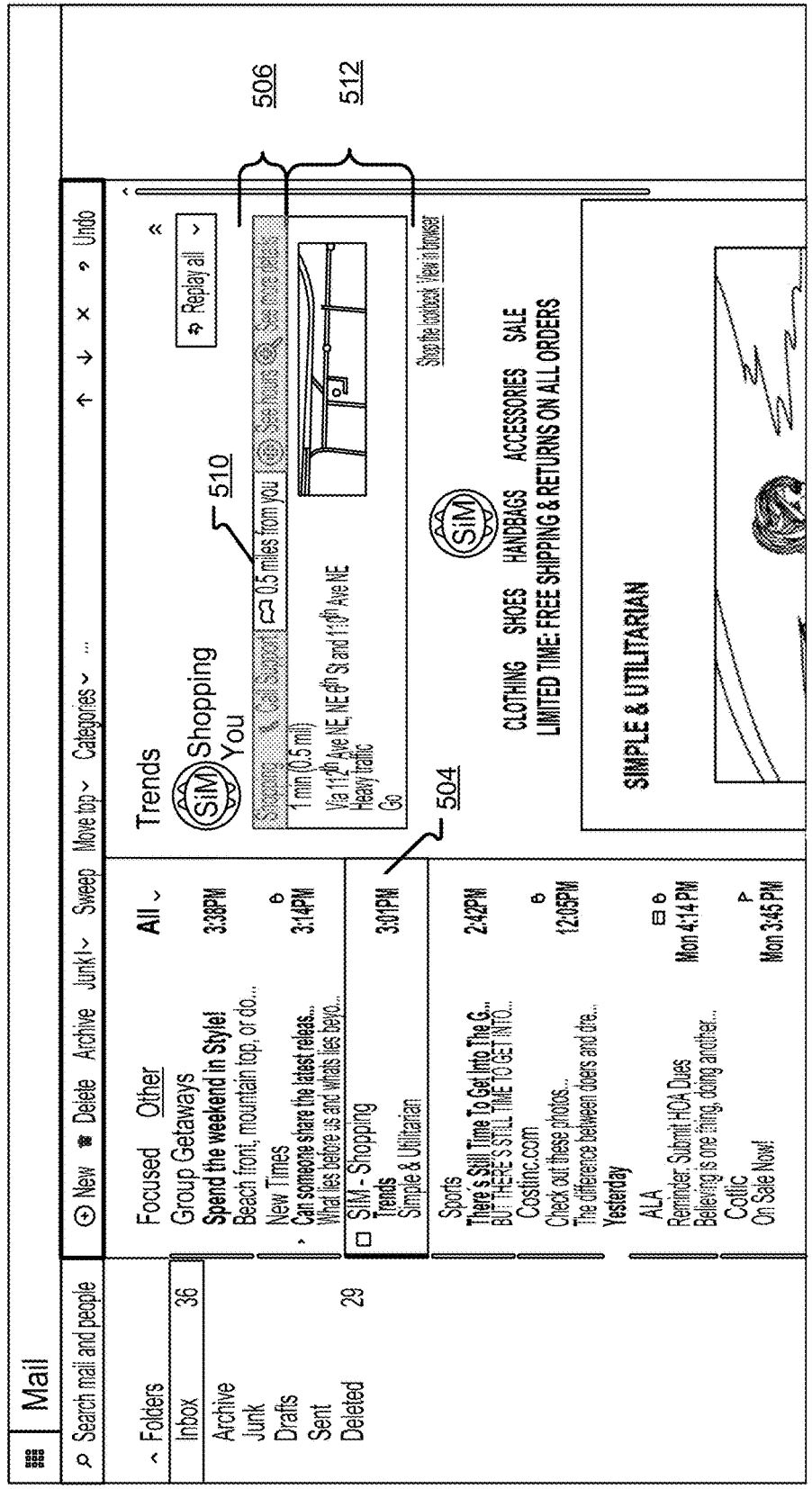

FIG. 5B presents a second option 510 associated with the contextually relevant content bar 506. Specifically, the contextually relevant content bar 506 includes an option to use context associated with the user to locate a nearest entity. For example, the contextually relevant content bar 506 displays that the nearest store associated with the entity is 0.5 miles from the user. Further, as shown in FIG. 5C, selection of the second option causes the contextually relevant content bar 506 to display additional information. In the illustrated example the contextually relevant content bar 506 is expanded to display additional information 512, including address information and an overview map of the entity's location.

Figure 5D:
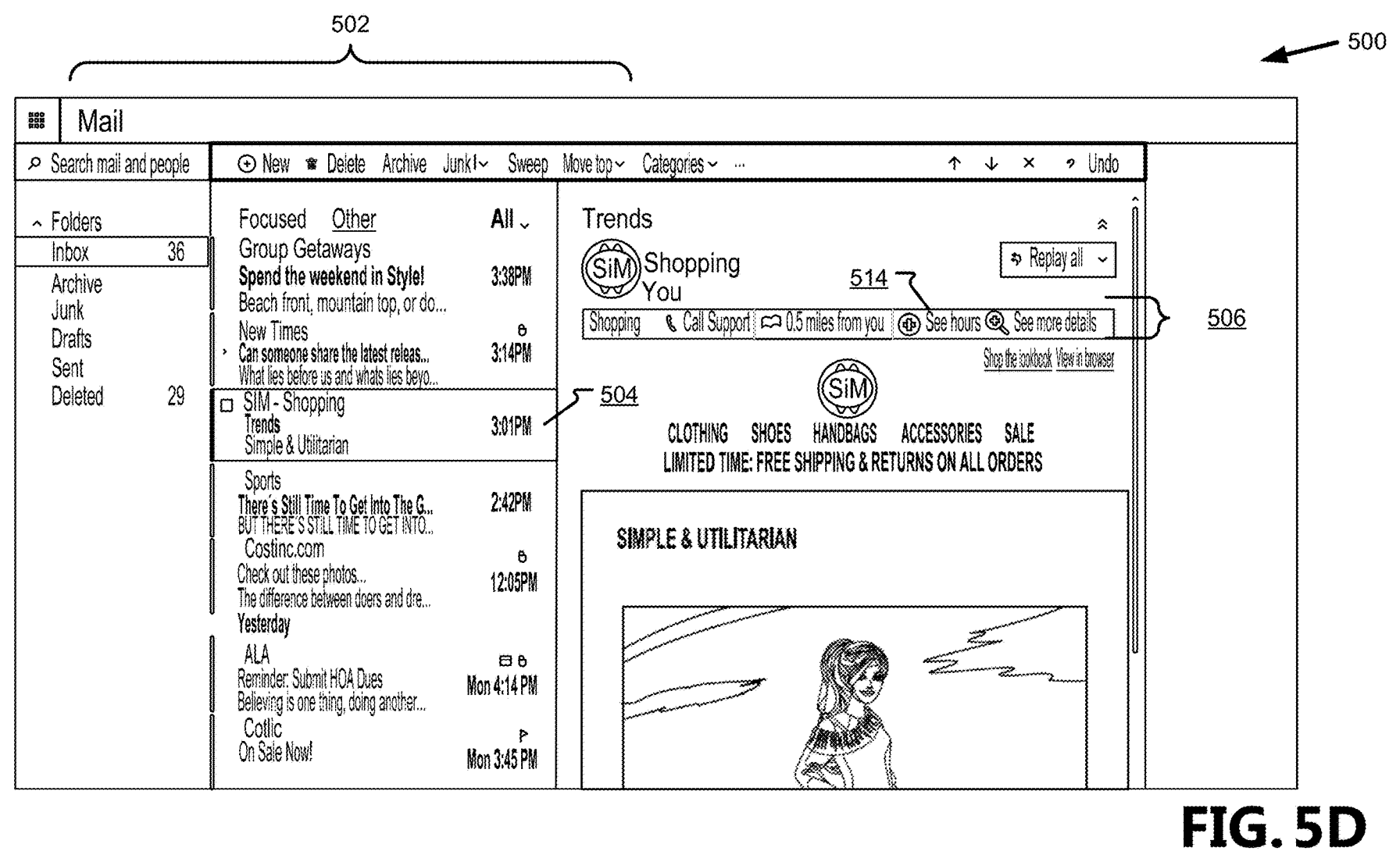
Figure 5E:
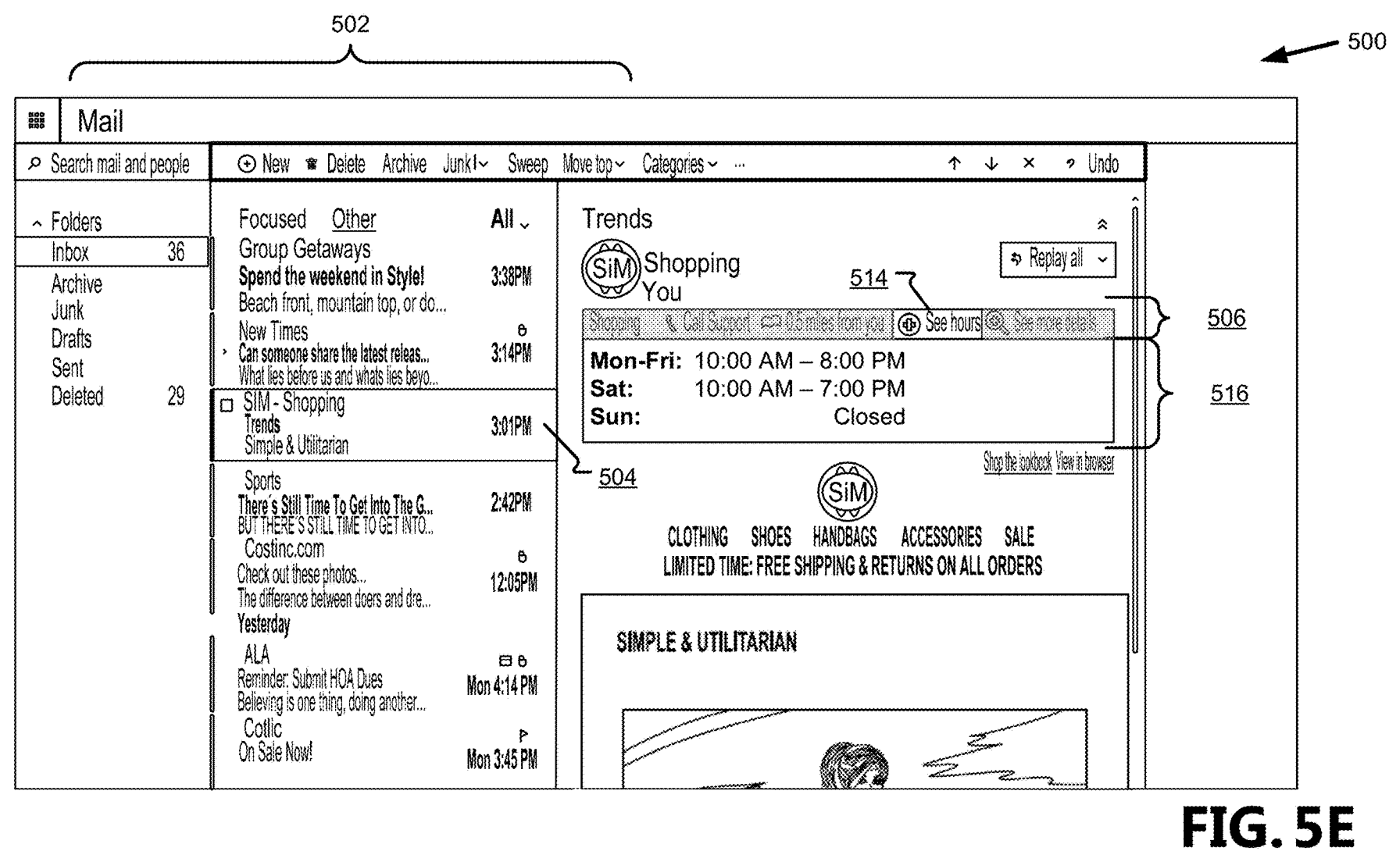

With regard to FIG. 5D, the contextually relevant content bar 506 includes a third option 514 for displaying information relating to the entity's business hours. In response to receiving a selection of the third option 514 from the user, FIGURE 5E depicts that the contextually relevant content bar 506 has been expanded. Specifically, the contextually relevant content bar 506 is expanded to display additional information 516 relating to the entity's business hours.

Figure 5F:
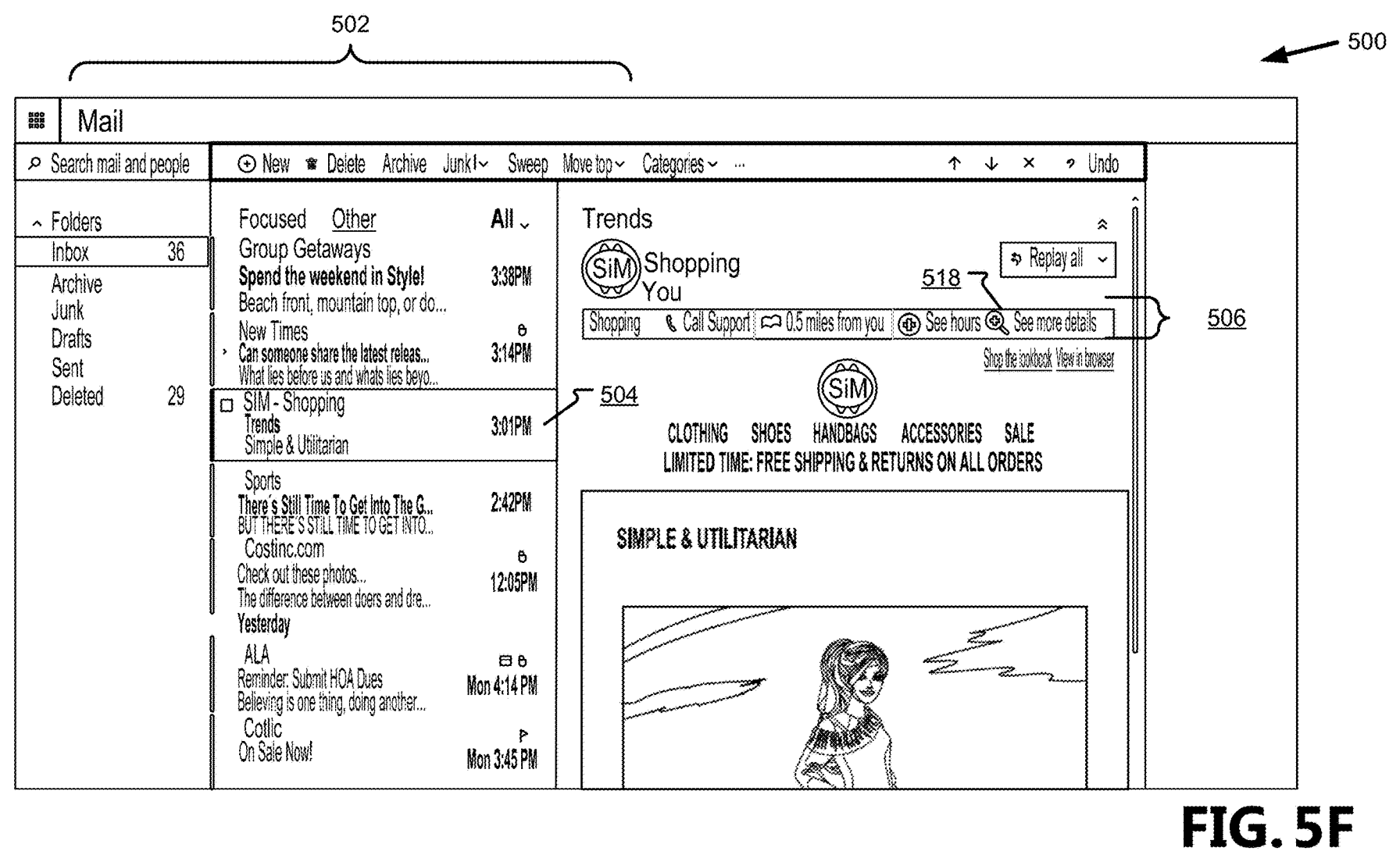

FIG. 5F presents a fourth option 518 that allows the user to see more data that are not included within the example email. For example, in the illustrated example the contextually relevant content bar 506 includes an option for "See more deals." However, it should be noted that in other examples, displaying additional contextual information may be not display options to see other content items, rather the additional contextual information is limited to specifically tailored actions and content relating to the content item.

Figure 5G:

As illustrated in FIG. 5G, selection of the "See more deals" causes the contextually relevant content bar 506 to display additional "deals" 520. Specifically, in the illustrated example, the contextually relevant content bar 506 is expanded downward to display additional sale items. The sale items include a brief description and links to further navigate towards the particular sale items.

According to another example aspect, after a user makes a purchase, the entity will email a receipt or send a satisfaction questionnaire. Further, the particular email may or may not include return instructions. However, assuming that the purchase needs to be returned, the contextually relevant content bar 506 includes a direct link to show additional information relating to returns. For example, the return information may specify a telephone number, a link to the returns website, or a link to the customer support center.

According to another aspect, the communications application 500 provides contextually relevant information associated with the content item relating to a purchase. For example, the communications application includes another option presented in the contextually relevant content bar 506 that provides a link for tracking information for a package associated with the purchase.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
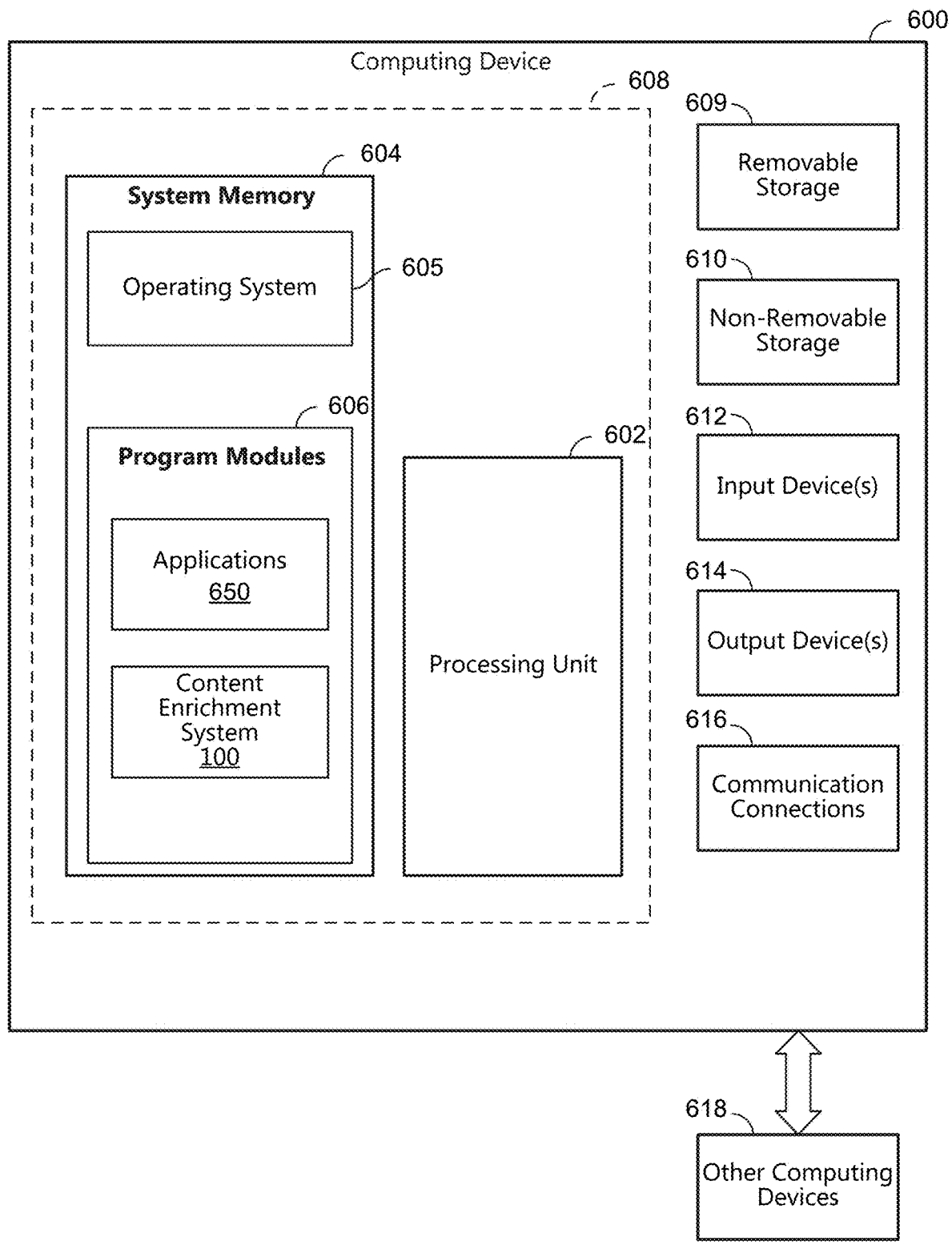
FIG. 6 is a block diagram illustrating example physical components of a computing device.
Figure 7A:
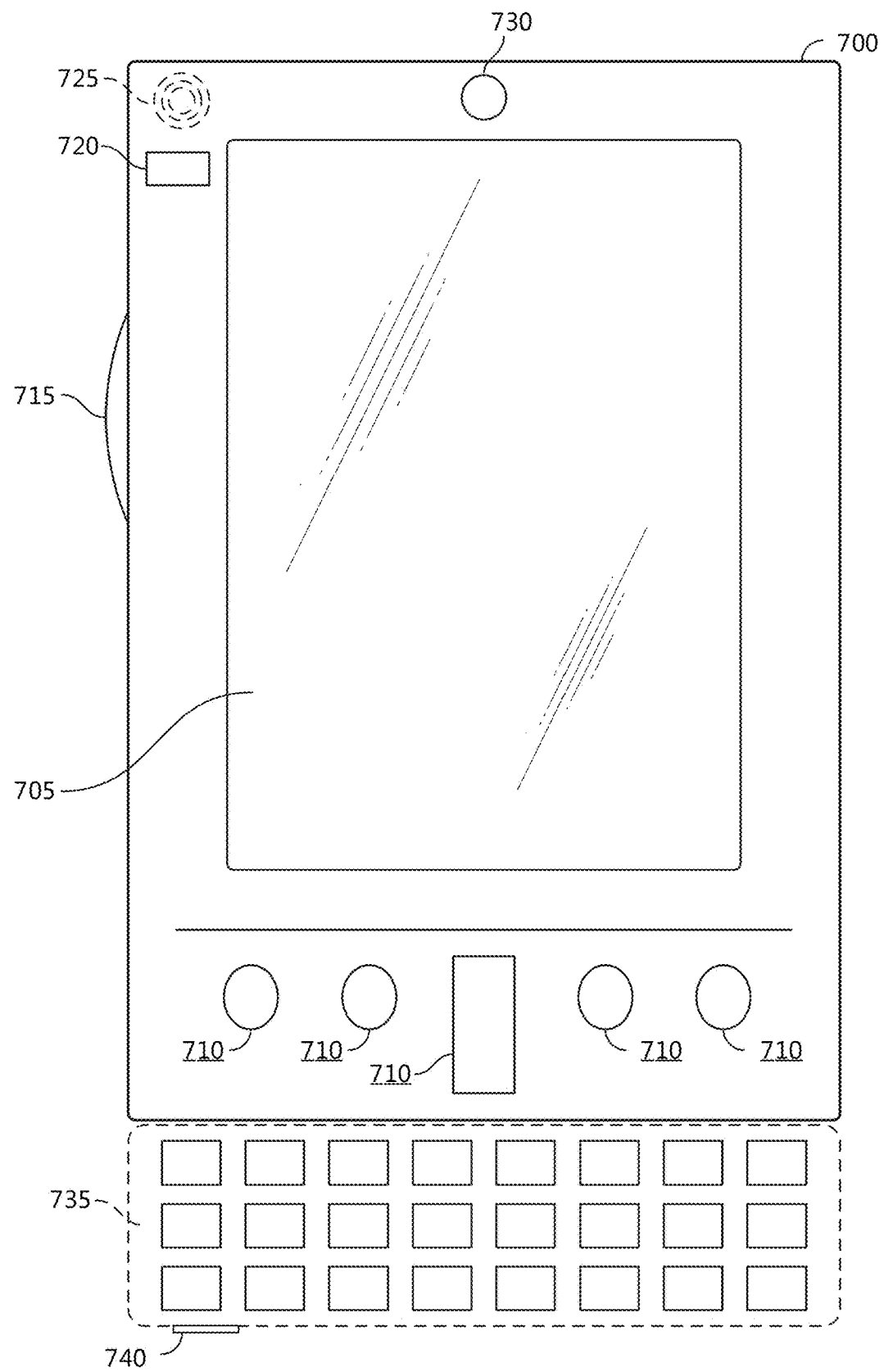
FIGS. 7A and 7B are block diagrams of a mobile computing device.
Figure 7B:
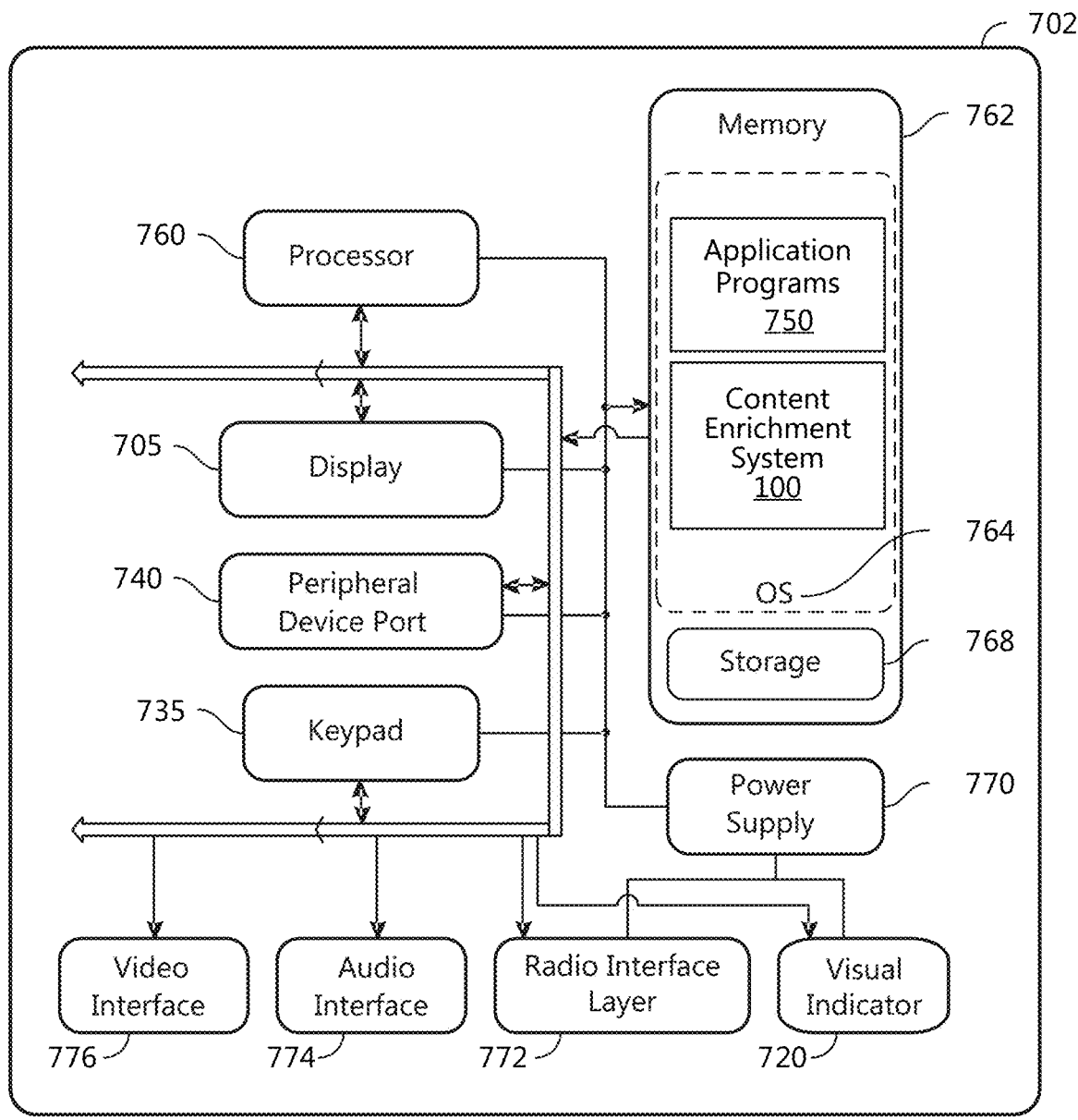
Figure 8:
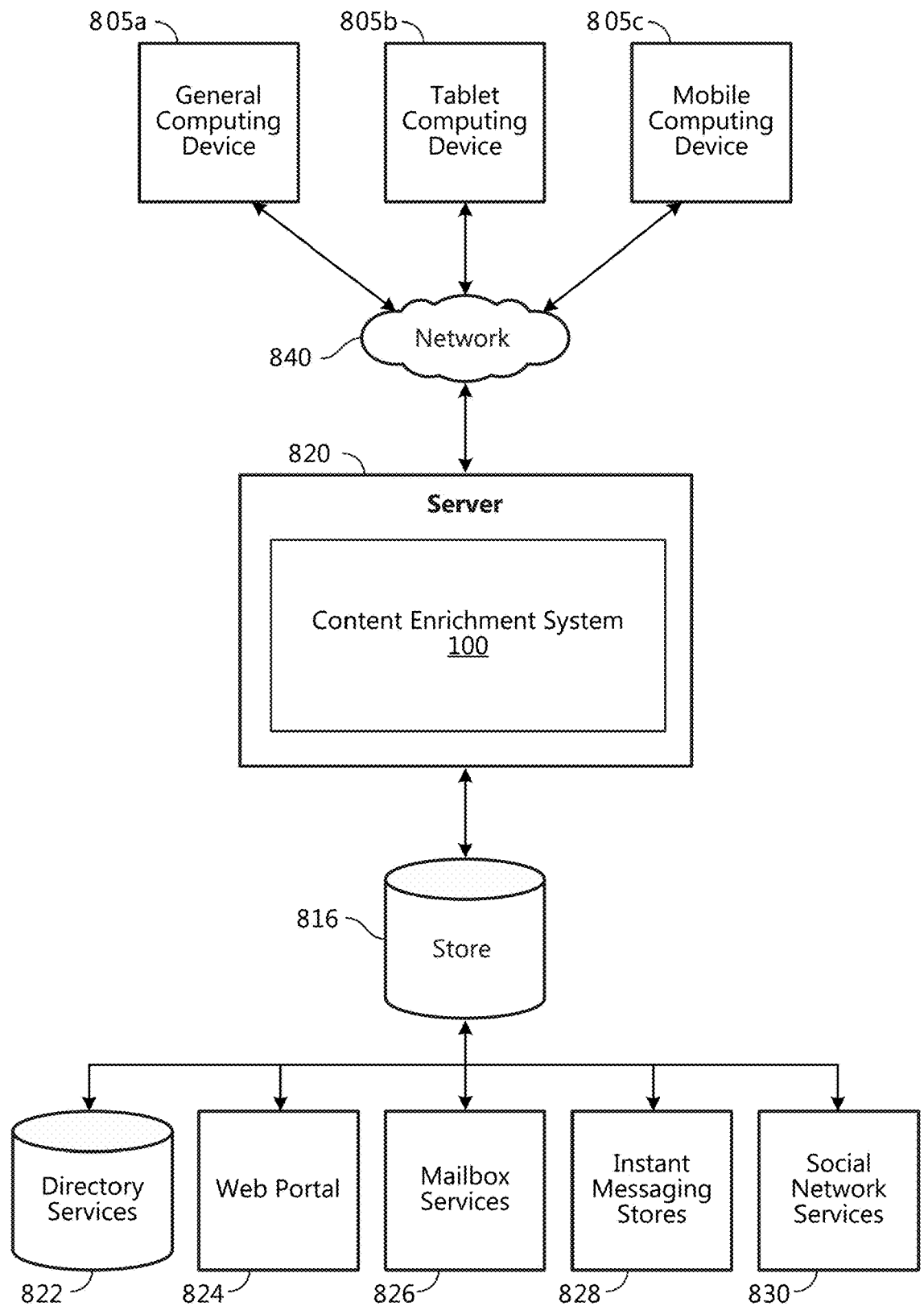
FIG. 8 is a block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes content enrichment system 100. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., content enrichment system 100) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates a peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, content enrichment system 100 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated, such data/information is/are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

FIG. 8 illustrates one example of the architecture of a system for providing enriched content as described above. Content developed, interacted with, or edited in association with the content enrichment system 100 is enabled to be stored in different communication channels or other storage types. For example, various documents may be stored using a directory service 822, a web portal 824, a mailbox service 826, an instant messaging store 828, or a social networking site 830. The content enrichment system 100 is operative to use any of these types of systems or the like for reducing latency of document change discovery in a co-authoring session, as described herein. According to an aspect, a server 820 provides the content enrichment system 100 to clients 805*a,b,c*. As one example, the server 820 is a web server providing the content enrichment system 100 over the web. The server 820 provides the content enrichment system 100 over the web to clients 805 through a network 840. By way of example, the client computing device is implemented and embodied in a personal computer 805*a*, a tablet computing device 805*b* or a mobile computing device 805*c* (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method of providing automatic enrichment of content with contextually relevant information, comprising:
   receiving a content item to display within an application user interface, wherein the content item is one of an e-mail or a calendar event;
   determining an entity associated with the content item;
   querying one or more data sources for results that relate to the entity;
   retrieving context information relating to the content item;
   based on the retrieved context information, identifying contextually relevant information from the results from querying the one or more data sources;
   causing a display of the content item within the application user interface;
   causing a display of a contextually relevant content bar positioned within the content item, wherein the contextually relevant content bar includes a plurality of selectable options relating to the contextually relevant information, the plurality selectable options including a first selectable option having a first label and a second selectable option having a second label;
   receiving a selection of a first option from within the contextually relevant content bar;
   in response to receiving the selection of the first option, causing the display of a first portion of the identified contextually relevant information within the display of the content item, the first portion of the identified contextually relevant information corresponding to the first label;
   receiving a selection of a second option from within the contextually relevant content bar; and
   in response to receiving the selection of the second option, causing the display of a second portion of the identified contextually relevant information within the display of the content item, the second portion of the identified contextually relevant information corresponding to the second label.

2. The method of claim 1, further comprising parsing the results in view of the context information based on the content item or the entity.

3. The method of claim 1, further comprising, based on a location of a recipient of the content item, determining a strength of the entity relative to other entities.

4. The method of claim 1, wherein the contextually relevant information includes promotional information relating to the entity.

5. The method of claim 1, wherein the contextually relevant content bar is positioned below a subject line of the content item.

6. The method of claim 1, wherein the entity is a business having multiple locations, and the contextually relevant information is filtered based on a location of a user to identify a closest location of the entity to the user.

7. The method of claim 6, wherein the first portion and the second portion of the contextually relevant information is specific to the identified closest location of the entity.

8. The method of claim 7, wherein the first portion of the contextually relevant content includes at least one of hours of operation of the identified closest location of the entity, and the second portion of the contextually relevant content includes a map of the identified closest location of the entity.

9. The method of claim 1, wherein the first selectable option displays a topic of the first portion the contextually relevant content and the second selectable option displays a topic of the second portion of the contextually relevant content.

10. The method of claim 1, wherein the entity is a destination city, and the context is a departure city.

11. The method of claim 1, wherein the context information relating to at least one of information relating to a user's communications, calendar events, location, or time zone.

12. A computing device for providing automatic enrichment of content with contextually relevant information, comprising:
   a processing unit; and
   a memory, including computer readable instructions, which when executed by the processing unit is operable to:
      receiving a calendar event to display within an application user interface;
      determining an entity associated with the calendar event;
      querying one or more data sources for results that relate to the entity;
      retrieving context information relating to the calendar event;
      parsing the results in view of the context information;
      identifying contextually relevant information from the parsed results;
      displaying the calendar event within the application user interface;
      causing a display of a contextually relevant content bar positioned within the calendar event, wherein the contextually relevant content bar includes a plurality of selectable options relating to the contextually relevant information the plurality selectable options including a first selectable option having a first label and a second selectable option having a second label;

receiving a selection of a first option from within the contextually relevant content bar;

in response to receiving the selection of the first option, causing the display of a first portion of the identified contextually relevant information concurrently with the display of the calendar event, the first portion of the identified contextually relevant information corresponding to the first label;

receiving a selection of a second option from within the contextually relevant content bar; and in response to receiving the selection of the second option, causing the display of a second portion of the identified contextually relevant information concurrently with the display of the calendar event, the second portion of the identified contextually relevant information corresponding to the second label.

13. The computing device of claim 12, wherein the entity is a city.

14. The computing device of claim 12, wherein parsing the results in view of the context information is based on the calendar event or the entity.

15. The computing device of claim 12, further comprising, based on a location of a recipient of the calendar event, determining a strength of the entity relative to other entities.

16. The computing device of claim 12, wherein the memory comprises further computer readable instructions, which when executed by the processing unit are operable to:

receiving a selection of a third option within the plurality of selectable options; and in response to receiving the selection of the third option, cause the computer device to perform a telephone call to the entity.

17. A computer readable storage device including computer readable instructions, which when executed by a processing unit is operable to:

receiving an email to display within an application user interface;

determining an entity associated with the email;

querying one or more data sources for results that relate to the entity;

retrieving context information relating to the email;

based on the retrieved context information, identifying contextually relevant information from the results; and causing a display of the email within the application user interface, causing a display of a contextually relevant content bar positioned within the e-mail, wherein the contextually relevant content bar includes a plurality of selectable option relating to the contextually relevant information, the plurality selectable options including a first selectable option having a first label and a second selectable option having a second label;

receiving a selection of a first option from within the contextually relevant content bar;

in response to receiving the selection of the first option, causing the display of a first portion of the identified contextually relevant information concurrently with and within the display of the email, the first portion of the identified contextually relevant information corresponding to the first label;

receiving a selection of a second option from within the contextually relevant content bar; and in response to receiving the selection of the second option, causing the display of a second portion of the identified contextually relevant information concurrently with and within the display of the email, the second portion of the identified contextually relevant information corresponding to the second label.

18. The computing readable storage device of claim 17, wherein the entity is a city.

19. The computing readable storage device of claim 17, wherein parsing the results in view of the context information is based on the entity.

20. The computing readable storage device of claim 17, further comprising, based on a location of a recipient of the email, determining a strength of the entity relative to other entities.

* * * * *